United States Patent [19]
Jones

[11] Patent Number: 5,456,968
[45] Date of Patent: Oct. 10, 1995

[54] PAPER LAMINATE AND METHOD FOR ITS MANUFACTURE

[75] Inventor: Elven Jones, Parkersburg, W. Va.

[73] Assignee: International Coverter, Inc., Belpre, Ohio

[21] Appl. No.: 82,748

[22] Filed: Jun. 25, 1993

[51] Int. Cl.⁶ .................................. B23B 3/00; D06N 7/04
[52] U.S. Cl. ...................... 428/178; 428/153; 428/154; 428/198; 428/535; 428/537.5
[58] Field of Search .................................. 428/178, 158, 428/156, 172, 34.2, 34.3, 103, 153, 154, 166, 198, 535, 537.5, 913

[56] References Cited

U.S. PATENT DOCUMENTS

| | | | |
|---|---|---|---|
| D.337,155 | 3/1986 | Heston | 428/535 |
| 2,158,762 | 8/1950 | Draheim | 154/50 |
| 4,320,162 | 3/1982 | Schulz | 428/154 |
| 4,481,243 | 11/1984 | Allen | 428/154 |
| 4,487,796 | 12/1984 | Lloyd et al. | 428/154 |
| 4,978,565 | 12/1990 | Pijneul et al. | 428/156 |
| 5,128,182 | 7/1992 | Bunker, et al. | 428/178 |

Primary Examiner—Donald L. Loney
Attorney, Agent, or Firm—Rockey, Rikfin and Ryther

[57] ABSTRACT

A two-ply paper-to-paper composite material having insulating properties and a method for its manufacture wherein the composite includes a pair of paper sheets, at least one of which has been treated to make it moisture-proof and grease-proof wherein the sheets are selectively bonded directly to the other to define air pockets therebetween wherein the bond is established by an alkali metal silicate adhesive.

6 Claims, 1 Drawing Sheet

PAPER LAMINATE AND METHOD FOR ITS MANUFACTURE

This invention relates to a sandwich wrap, and more specifically to a two-ply paper-to-paper composite material formed of a pair of treated paper sheets having moisture and grease resistance.

BACKGROUND OF THE INVENTION

There has been a need for sometime for packing materials for use in, for example, fast foods which is considerably less expense than package materials heretofore used and which is biodegradable and repulpable. Considerable efforts have been made in the prior art to provide such packaging materials which have the necessary resistance to grease, but without success.

For example, in U.S. Pat. No. 337,155 there is described a grease-proof paper in which two or more sheets of a treated paper are bonded together to form a solid laminate by means of a sodium silicate adhesive. In the composite there described, the sodium silicate adhesive is laid down as a continuous layer between the sheets of paper, and that type of arrangement does not provide any substantial insulating properties. In addition, the composite described in the foregoing patent does not have the necessary flexibility for use in, for example, sandwich wrappings.

Attempts have been made to improve on that basic concept, typically by including polymer substrates as a layer in the composite. One such example is described in U.S. Pat. No. 5,128,182 which describes a composite formed of a layer of absorbent material and a layer of a printable material with an intermediate layer interposed there between formed of a pigmented polymer. The need to use a polymer layer in the composite increases substantially the cost of such a composite, and, at the same time, minimizes the ability of the composite to undergo biodegrading and repulping. In addition, because of the need to use a polymer layer in the composite, the establishment of a secure bonding relationship between the paper layers is also made more difficult. A similar packaging material is described in U.S. Pat. Nos. 2,518,762 and 2,526,787.

Other attempts to develop packaging materials are exemplified by U.S. Pat. No. 5,023,134 which utilizes a paper substrate having a polypropylene-base wax coating on each side of the paper. Composites of that sort do not provide the necessary insulating properties frequently desired for packaging applications.

It has been proposed in U.S. Pat. No. 4,487,796 to provide a laminate of absorbent paper sheets by selectively adhering together with a sodium silicate adhesive to absorbent paper products, thus forming spot laminates with air pockets distributed between the sheets. That patent illustrates one of the problems which the prior art has faced in the manufacture of packaging materials. When the paper sheets employed have been chemically treated to render them moisture and grease resistance, there has been a tendency for adhesives to fail in establishing a bonding relationship between the treated paper sheets. In other words, the more resistant the paper sheets are impermeable by either moisture or grease, the more resistance such sheet exhibit toward bonding each to the other.

Accordingly, it is an object of the present invention to produce and provide a method for producing a packaging material suitable for use as a sandwich wrap in which two or more sheets of paper which have been treated is moisture and grease resistance are bonded together to provide an inexpensive, biodegradable and repulpable paper product.

SUMMARY OF THE INVENTION

The concept of the present invention reside in a two-ply sandwich wrap in the form of a paper-to-paper composite material having insulating properties in which a pair of paper sheets, at least one of which has been treated to make the sheet moisture-proof and grease-proof, are selectively bonded directly to the other to define a pattern of air pockets therebetween. It has been found quite unexpectedly that the bonding between the two treated sheets can be effectively established by means of an alkali metal silicate adhesive. It has been found that such alkali metal silicates are effective to establish a secure bonding relationship between the treated paper sheets in light of the fact that other, more expensive adhesives were found to be ineffective in promoting adhesion between the two sheets.

In accordance with the process of the invention, the novel composite of the present invention is produced by contacting a treated paper sheet with an etched cylinder to selectively apply to the surface of the sheet the alkali metal silicate in a predetermined pattern. The sheet is then contacted with another sheet of paper between a pair of combining nip role to selectively bond the two sheets of paper together to form the composite of the invention.

The composite and method of the present invention provides an inexpensive two-ply paper laminate which is resistant to both moisture and grease, employing an inexpensive adhesive without sacrificing strength and packaging effectiveness. The laminate of the present invention has the advantage of being biodegradable and repulpable because it eliminates all together any need to employ packaging layers typically utilized by the prior art such as polypropylene or polyolefin, or metal foils. Because the packaging material of the present invention completely avoids any need to use a material foil, it can safely and conveniently be used in conventional microwave ovens. Because it contains a pattern of air pockets produced by spot laminated layering, the packaging composite of the invention also provides insulating characteristics.

DETAILED DESCRIPTION OF THE INVENTION

Figure 1:
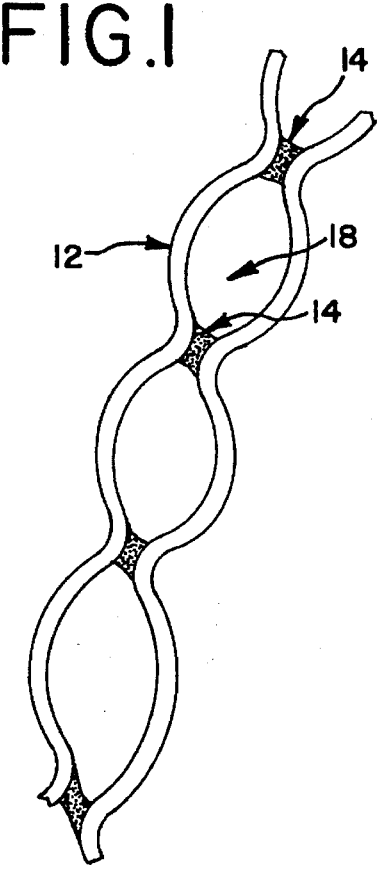
FIG. 1 illustrates a longitudinal sectional view of a sheet of grease-proof paper spot laminated to another sheet of paper in accordance with the concept of the invention.

In the preferred practice of the invention, the two-ply paper-to-paper composite material is formed of at least one treated paper sheet 10 which has been bonded to a second paper sheet 12 in a pre-determined selected fashion, with the bond being established by means of a layer an alkali metal silicate 14 as shown in FIG. 1. In the preferred practice of the invention, paper sheets 10 and 12 are each treated to render each sheet moisture-proof and grease-proof although it will be understood by those skilled in the art that it is also possible to form the composite of the present invention wherein only one of the two sheets 10 and 12 has been treated.

Figure 2:
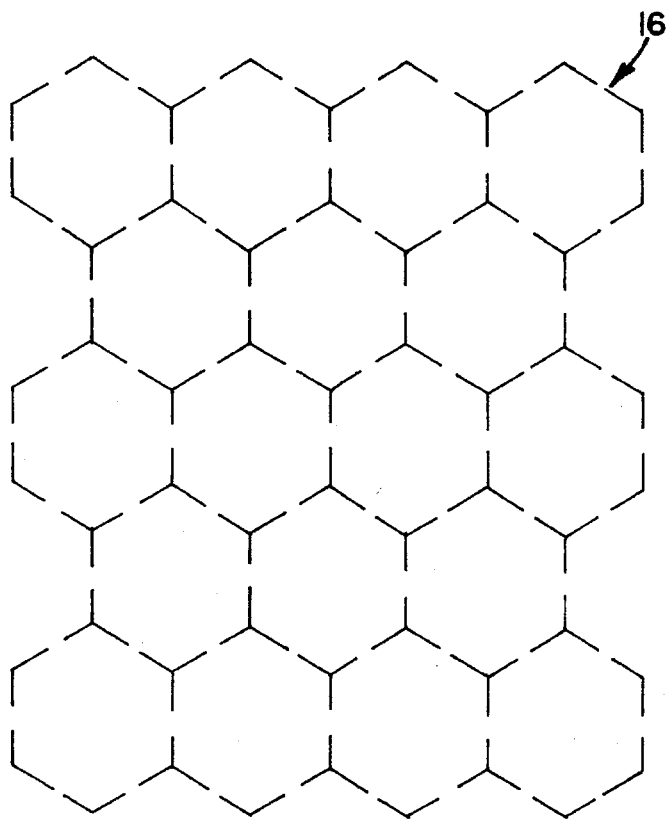
FIG. 2 represents a typical adhesive pattern of the laminate illustrated in FIG. 1.

The adhesive is selectively applied in any of a number of pre-determined patterns. One such preferred pattern is shown in FIG. 2 of the drawing in which the adhesive is laid down on the surface of one of the sheets 10 and 12 in a hexagonal configuration 16 as illustrated in FIG. 2. It is generally sufficient that the adhesive alkali metal silicate adhesive be applied in discreet areas in the pre-determined pattern to form the composite invention. While a hexagonal pattern is illustrated in FIG. 2, it will be understood by those skilled in the art that a variety of other pre-determined patterns can likewise be used.

The configuration of the composite as illustrated in FIG. 1 facilitates trapped air in a pocket 18 between the two sheets 10 and 12 and between adjacent sections of adhesive 14. The use of air pockets in those areas between the points at which the two sheets are bonded between the surfaces of the two sheets thus assure that the composite of the present invention will provide insulating characteristics to, for example, food products packaged in the composite of the invention.

As the treated sheets 10 and 12, use can be made of the variety of treated papers which exhibit both moisture and grease resistance. One type of treated paper is treated paper available commercially which is referred in the art as fluorocarbon impregnated paper. Other treated papers such as papers treated or impregnated with "poly-wax", typically a low molecular weight polymer applied to a paper surface or glassine. All such papers are well known to those skilled in the art, and are typically 13–15 pound papers; depending on the field of application, higher or lower weight papers can also be used. One particular preferred fluorocarbon treated paper is available commercially from the Thilmany Division of International Paper. Other types of treated papers are described in U.S. Pat. Nos. 4,529,658, 4,426,466, 3,811,933, 3,068,187 and 2,610,939.

As the adhesive, use is made of an alkali metal silicate adhesive well known to those skilled in the art, and preferably a sodium silicate adhesive. Typically, such adhesives are high pH, high solid sodium silicate solutions. Such adhesives are commercially available from a number of suppliers including Occidental Chemical Company, Interstate, Diamond Shamrock, Philadelphia Quartz and Ashland Chemical. It has been unexpectedly found that even though the sheet or sheets employed in making the composite of the present invention have been chemically treated to render them grease resistant and moisture resistant, such alkali metal silicate adhesives nonetheless provide a secure bonding relationship in those areas in which the sheets are bonded together to provide a laminate having sufficient tensile strength, bond strength and grease resistance for use as a food packaging composite. The use of such alkali metal silicates provide an inexpensive adhesive without sacrificing the strength of the composite or its packaging effectiveness. It has been found that the amount of alkali metal silicate applied to the surface of the paper during the manufacture of the composite of the invention should have a thickness of at least 50 microns. In general, an adhesive thickness less than 50 microns can result in insufficient bonding and adhesive strength. For most applications, the adhesive should be applied to a thickness within the range of 50–100 microns. At thicknesses above 100 microns, it has been found that additional thickness of adhesive typically does not justify the use of greater quantities of adhesive.

It has been found that paper-to-paper laminate of the present invention utilizing a alkali metal silicate adhesive provides a tensile strength superior in cross direction and machine direction as compared to one-quarter mil thickness metal foil laminated with 25–30 pound bleached machine glazed paper.

It was totally unexpected that an inexpensive adhesive such as a sodium silicate adhesive would provide sufficient tensile strength utilizing treated paper. Because sodium silicate is typically a hydrophilic adhesive, it was anticipated that such treated papers which are generally impermeable to grease and moisture would be incompatible with the adhesive. The results obtained in the practice of the present invention were particularly surprising when sodium silicate adhesives were found to be more suitable than the more expensive acrylic-type emulsion adhesives.

Figure 3:
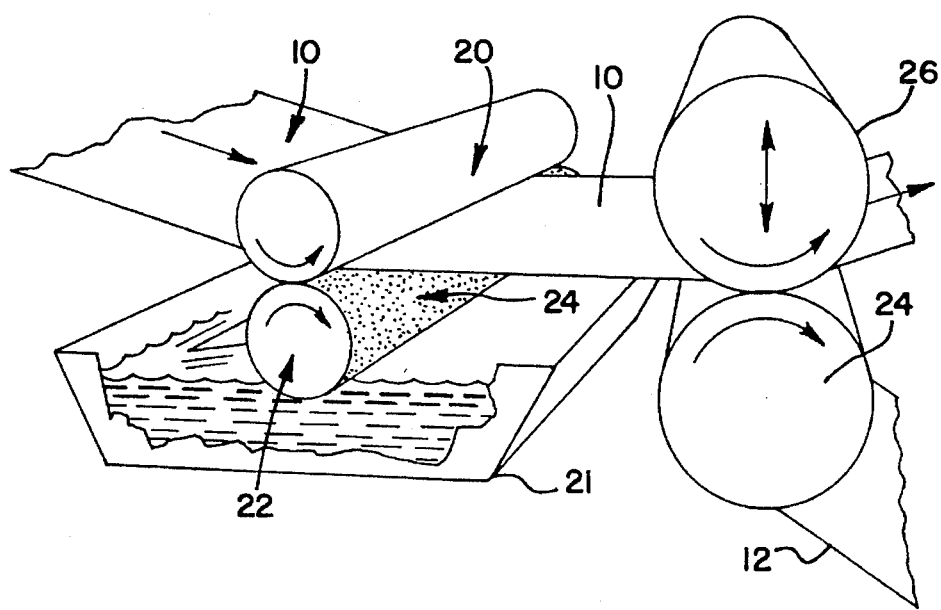
FIG. 3 is a schematic illustration of the method employed in producing the laminate of the present invention.

The composite of the present invention is preferably produced by means of the schematic illustration shown in FIG. 3 of the drawing. As there shown, a single sheet of treated paper 10 is passed between a pair of rollers 20 and 22, roller 20 being an essentially smooth roller made from an elastomeric material such as rubber, while roller 22 is an etched cylinder having on the surface the desired pattern of the adhesive to be applied on the surface of the sheet 10. The roller 22 is in contact with a supply of adhesive 21 which continuously supplies adhesive to the etched portions of the cylinder 22 in conformance with the pattern on etched cylinder 22. Thus, the roller 22 includes raised portions 24 having a surface corresponding to the selective pattern to apply the adhesive in the selective pattern to the surface of the sheet 10. Thereafter, the sheet 10 having a pattern of adhesive deposited on one surface thereof is passed to a combiner station where it is bonded to the second sheet which may be either a treated paper or one which has not been treated. In the preferred practice of the invention as described in figure 3, the second sheet 12 is passed over a roller 24 which is in engagement with an upper roller 26. In that means, the second sheet 12 is contacted with the first sheet 10 having the adhesive on one surface thereof between the nip of rollers 24 and 26 whereby the second sheet 12 is adhesively bonded to the first sheet 10.

Thus, the method of the invention provides a simple and inexpensive technique for producing inexpensively the composite of the present invention.

It will be understood that various changes and modifications can be made in the details of procedure, structure and use without departing from the spirit of the invention, especially as defined in the following claims.

What is claimed is:

1. A two-ply paper-to-paper sandwich wrap composite material having insulating properties comprising a pair of paper sheets, at least one of said sheets being an impregnated sheet having moisture-proof and grease-proof properties, with each of said sheets being selectively bonded directly to the other to define air pockets between said sheets, the bond between said sheets being established by an alkali metal silicate adhesive.

2. A composite as defined in claim 1 wherein the adhesive is a sodium silicate adhesive.

3. A composite as defined in claim 1 wherein each of said sheets is an impregnated sheet to render it moisture-proof and grease-proof.

4. A composite as defined in claim 1 in which the adhesive is applied to one of said sheets in a hexagonal pattern.

5. A composite as defined in claim 1 wherein at least one of said sheets is a fluorocarbon impregnated paper.

6. A composite as defined in claim 1 wherein the adhesive is applied in a thickness of at least 50 microns.

* * * * *